J. D. SCHAKEL.
SELF OILING BEARING FOR ELEVATOR MACHINES.
APPLICATION FILED DEC. 12, 1918.
1,373,570. Patented Apr. 5, 1921.
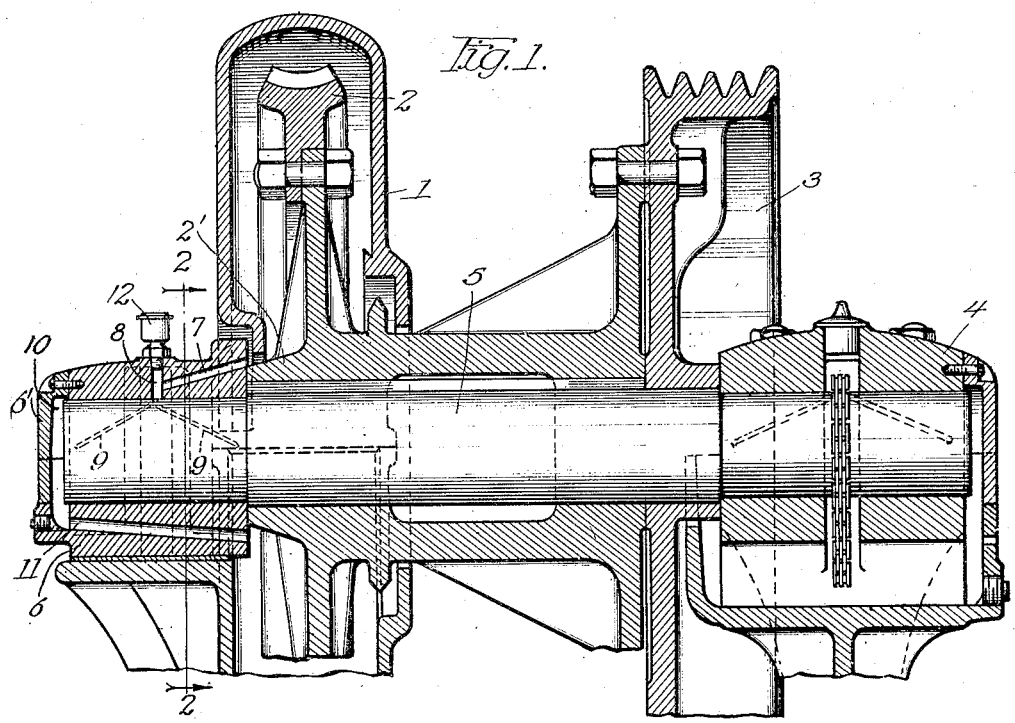
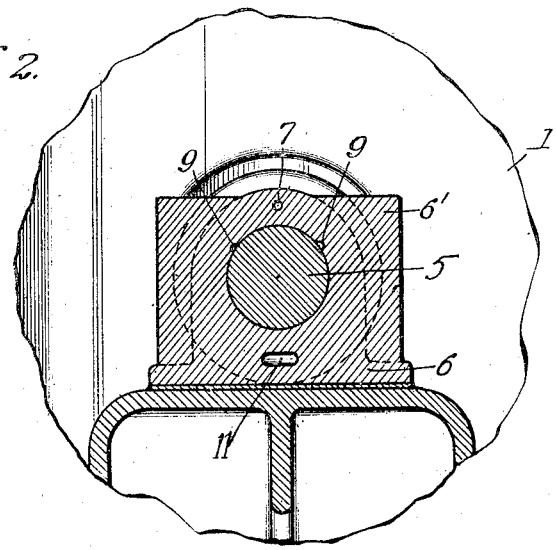
Witnesses:
Arthur W. Carlson
Robert H. Weir
Inventor:
Jacob D. Schakel
by Hebel & Mueller
Attys.

UNITED STATES PATENT OFFICE.

JACOB D. SCHAKEL, OF CHICAGO, ILLINOIS, ASSIGNOR TO ELEVATOR COMPANY OF AMERICA, OF CHICAGO, ILLINOIS.

SELF-OILING BEARING FOR ELEVATOR-MACHINES.

1,373,570.    Specification of Letters Patent.    Patented Apr. 5, 1921.

Application filed December 12, 1918. Serial No. 266,411.

*To all whom it may concern:*

Be it known that I, JACOB D. SCHAKEL, a citizen of the United States, residing at Chicago, in the county of Cook and State of Illinois, have invented a certain new and useful Improvement in Self-Oiling Bearings for Elevator-Machines, of which the following is a full, clear, concise, and exact description, reference being had to the accompanying drawings, forming a part of this specification.

My invention relates to self-oiling bearings for elevator machines and is directed more particularly to the provision of oiling means whereby the bearing adjacent to the sheave worm-gear is automatically oiled by feeding oil thereto from the hub of the worm-gear, the hub being fed with oil as the worm gear revolves in the oil containing housing.

In prior machines oil reservoirs have been provided in the bottom of the worm-gear housing and this oil was permitted to run down upon the worm gear hub, but in these machines the oiling of the bearing was very unreliable because the oil would fail to flow freely to the shaft bearing due to the end thrust existing between the adjoining faces of the gear hub and the bearing. The result was that the bearing required frequent attention from an attendant or it would sometimes run dry. All this has been overcome by my improved construction in which a reliable self-oiling bearing is provided.

My invention is illustrated in the accompanying drawing in which—

Figure 1 is a sectional view through an elevator machine showing my improved self-oiling bearing; and Fig. 2 is a sectional view along the line 2, 2 of Fig. 1 showing the oiling ducts.

Referring now more particularly to the preferred form of my invention as illustrated herein it comprises the usual worm gear housing 1 which incloses a worm gear 2 and carries a supply of lubricating oil in the bottom portion of the chamber through which the worm gear 2 runs. The usual sheave 3 is also shown and a bearing 4 for the sheave end of the worm gear shaft 5. This shaft 5 is rigidly attached to the worm gear 2 and is supported in a bearing adjacent the worm gear consisting of a lower housing 6 and a cap 6' which acts as a cover for the end of the bearing and provides a cup-shaped opening 10 which acts as a clearance-chamber for the end of the shaft 5 and also acts as a duct for the circulating oil. Extending through the upper portion 6 of the bearing is a duct 7 which connects with a duct 8 leading into the bearing and having grooves 9 running therefrom so as to feed the oil along the shaft. Now in order to furnish a supply of oil I extend the duct 7 to a point adjacent the hub 2' of the worm gear 2 so that as the gear 2 revolves oil is carried from the bottom of the reservoir in housing 1 to the top of the gear and then runs down alongside the gear to the hub 2' and then into the duct 7 where it is carried to the shaft and bearing. Thus it will be apparent that the bearing is automatically oiled and a continuous circulation of this oil is effected through the ducts 7, 8, 9, 10, and 11 maintaining the bearing well oiled without any attention from an attendent.

I have also provided auxiliary oiling apparatus in the form of an oil cup 12 through which oil may be fed to this bearing but is simply added as an extra precaution to permit manual oiling when desired.

It will thus be seen that I have provided a self oiling bearing in which the oil may circulate freely and in which the circulation is continuous as long as the machine is being operated.

For the purpose of illustrating my invention I have shown it in the preferred form, but I contemplate applying it in other ways than that shown, and understand that changes and modifications will readily occur to those skilled in the art. Therefore, I do not desire to be limited to the exact construction shown and described, but aim to cover all that which comes within the spirit and scope of the appended claims.

What I claim as new and desire to secure by Letters Patent is:

1. A machine of the character described comprising a gear wheel having a hub, an oil housing therefor, a shaft and bearing for the gear, and an oil duct leading from the bearing to a point above the gear hub and in line with the outer circumferential surface thereof so as to act as an oil conductor from the surface of the gear hub to the bearing.

2. A machine of the character described comprising a gear wheel having a hub, an oil housing therefor, a shaft and bearing for the gear, said bearing and gear hub having abutting faces, and an oil duct leading from the face of the bearing at a point above the gear hub and in line with the outer circumferential surface thereof to the shaft so as to act as an oil conductor from the outer surface of the gear hub to the bearing.

3. A machine of the character described comprising a gear wheel having a hub, an oil housing therefor, whereby oil is conducted by the gear to the gear-hub, a shaft and bearing for the gear, an oil duct leading from the bearing to a point above the gear hub and in line with the outer circumferential surface thereof so as to act as an oil conductor from the outer surface of the gear-hub to the bearing and other ducts for conducting excess oil back to the housing.

4. A machine of the character described comprising a gear wheel having a hub, an oil housing therefor, a shaft and bearing for the gear, and an oil duct leading from the outer circumferential surface of said hub to the bearing, to act as an oil conductor from the gear hub to the bearing.

5. A machine of the character described comprising a gear, an oil housing therefor, a shaft and bearing-box for the gear, and an oil duct leading through the bearing-box directly from the outer surface of the hub to the bearing and back to the housing, said duct having an opening through the side of said bearing box that is exactly in line with the outer surface of said hub whereby the oil has an unobstructed flow from the surface of said hub to said bearing.

6. A machine of the character described comprising a gear wheel having a hub, said hub having a tapered outer surface, an oil housing for said gear wheel, a shaft and bearing for said gear, and an oil duct leading directly from the small end of said hub to said bearing, whereby oil carried on said gear will be transmitted to said hub and flow across said tapered surface directly into said oil duct and to said bearing.

7. A machine of the character described comprising a gear wheel having a hub, said hub having a tapered outer surface, an oil housing for said gear wheel, a shaft and bearing for said wheel and an oil duct leading directly from the small end of said hub to said bearing, whereby oil carried on said gear will be transmitted to said hub and flow across said tapered surface directly into said oil duct to said bearing; and other ducts for conducting excess oil from said bearing to said housing.

8. A machine of the character described comprising a gear wheel having a hub provided with an outer surface tapering toward one end thereof, a shaft and bearing for said gear and an oil duct extending through said bearing and opening out of the side thereof in line with the said tapered outer hub surface whereby the oil will flow from said hub directly into said duct and to said bearing solely by the action of gravity.

9. A machine of the character described comprising a gear wheel having a hub provided with an outer surface tapering toward one end thereof, a shaft and bearing for said gear, said bearing and said hub having their adjacent ends in abutting relation, and an oil duct extending through said bearing and opening out of the side thereof in line with the said tapered outer hub surface whereby the oil will flow from said hub directly into said duct and to said bearing solely by the action of gravity.

In witness whereof, I hereunto subscribe my name this 22nd day of November A. D., 1918.

JACOB D. SCHAKEL.